United States Patent
Xing et al.

(10) Patent No.: US 12,160,529 B2
(45) Date of Patent: Dec. 3, 2024

(54) RECONFIGURABLE PUF DEVICE BASED ON FULLY ELECTRIC FIELD-CONTROLLED DOMAIN WALL MOTION

(71) Applicant: INSTITUTE OF MICROELECTRONICS OF THE CHINESE ACADEMY OF SCIENCES, Beijing (CN)

(72) Inventors: Guozhong Xing, Beijing (CN); Huai Lin, Beijing (CN); Di Wang, Beijing (CN); Long Liu, Beijing (CN); Kaiping Zhang, Beijing (CN); Guanya Wang, Beijing (CN); Yan Wang, Beijing (CN); Xiaoxin Xu, Beijing (CN); Ming Liu, Beijing (CN)

(73) Assignee: INSTITUTE OF MICROELECTRONICS OF THE CHINESE ACADEMY OF SCIENCES, Beijing (CN)

( * ) Notice: Subject to any disclaimer, the term of this patent is extended or adjusted under 35 U.S.C. 154(b) by 266 days.

(21) Appl. No.: 18/061,953

(22) Filed: Dec. 5, 2022

(65) Prior Publication Data

US 2023/0124011 A1   Apr. 20, 2023

Related U.S. Application Data

(63) Continuation of application No. PCT/CN2021/131308, filed on Nov. 17, 2021.

(30) Foreign Application Priority Data

Oct. 19, 2021   (CN) .......................... 202111216656.3

(51) Int. Cl.
    H10N 50/80    (2023.01)
    G06F 7/58    (2006.01)
    (Continued)

(52) U.S. Cl.
    CPC ............ *H04L 9/3278* (2013.01); *G06F 7/588* (2013.01); *G11C 11/14* (2013.01); *G11C 11/161* (2013.01);
    (Continued)

(58) Field of Classification Search
    CPC ...... H04L 9/3278; H10N 50/80; H10N 50/85; H10N 50/10; G06F 7/588; G11C 11/14;
    (Continued)

(56) References Cited

U.S. PATENT DOCUMENTS

| 2020/0058339 A1* | 2/2020 | Hong | ...................... G06N 3/049 |
| 2021/0098692 A1* | 4/2021 | You | ........................ H04L 9/0866 |

* cited by examiner

*Primary Examiner* — Alexander Sofocleous
*Assistant Examiner* — Tracy Hampton
(74) *Attorney, Agent, or Firm* — Syncoda LLC; Feng Ma

(57) ABSTRACT

A reconfigurable PUF device based on fully electric field-controlled domain wall motion includes a voltage control layer, upper electrodes, a lower electrode, antiferromagnetic pinning layers, and a magnetic tunnel junction (MTJ). The MTJ includes, from bottom to top, a ferromagnetic reference layer, a potential barrier tunneling layer and a ferromagnetic free layer. In the device, an energy potential well is formed in a middle portion of the ferromagnetic free layer by applying a voltage to the voltage control layer to control magnetic anisotropy, and a current is fed into either of the upper electrodes to drive generation of the magnetic domain walls and pin the magnetic domain walls to the potential well. After the voltage is removed, the potential well is lowered so that the magnetic domain walls are in a metastable state, thereby either a high resistance state or a low resistance state is randomly obtained.

8 Claims, 6 Drawing Sheets

(51) Int. Cl.
*G11C 11/14* (2006.01)
*G11C 11/16* (2006.01)
*H01F 10/32* (2006.01)
*H04L 9/32* (2006.01)
*H10N 50/10* (2023.01)
*H10N 50/85* (2023.01)

(52) U.S. Cl.
CPC ...... *G11C 11/1673* (2013.01); *G11C 11/1695* (2013.01); *H01F 10/3268* (2013.01); *H10N 50/10* (2023.02); *H10N 50/80* (2023.02); *H10N 50/85* (2023.02)

(58) Field of Classification Search
CPC .............. G11C 11/161; G11C 11/1673; G11C 11/1695; H01F 10/3268
USPC ........................................................ 365/158
See application file for complete search history.

RECONFIGURABLE PUF DEVICE BASED ON FULLY ELECTRIC FIELD-CONTROLLED DOMAIN WALL MOTION

CROSS-REFERENCE TO RELATED APPLICATIONS

This is a continuation of International Patent Application No. PCT/CN2021/131308 filed on Nov. 17, 2021, which claims priority to Chinese Patent Application No. 202111216656.3 filed on Oct. 19, 2021. The disclosures of the above-referenced applications are hereby incorporated by reference in their entirety.

BACKGROUND

A generation speed of data has been accelerated with the advancement of the process of informatization, and higher requirements are being required for the security of various types of data. With developments of Internet of Things and edge computing, more and more data and information are generated at data terminals. Thus, an encryption method with high integration, high speed and low power consumption has become a main development trend in future.

As for Physical Unclonable Function (PUF), which is a method for ensuring information security from the prospective of physical structure, key generation is initially implemented by using small differences in the device manufacturing processes or using an oscillator so that identical data cannot be reproduced even through the exact same process and structure, just like "fingerprint" of a device. Due to its excellent security performance, PUF has good applications in the protection of property rights, key generation, and system authentication, and also has good application prospects in other fields such as information security.

However, so far, a PUF device requires an external magnetic field to provide deterministic switching of magnetic domain, which is not conducive to integration of devices.

SUMMARY

The present application relates to the technical field of information security, and in particular, to a reconfigurable PUF device based on fully electric field-controlled domain wall motion.

The objective of the present disclosure is at least in part to provide a reconfigurable PUF device based on fully electric field-controlled domain wall motion, by means of which the current technical problem that a PUF device requires an external magnetic field to support a deterministic switching of magnetic domain, which is not conducive to integration of devices, has been solved or partially solved. With the reconfigurable PUF devices, magnetic domain walls can be generated and randomly moved by electrical methods, and a magnetic field is not required to control the generation and random movement, and thus a highly reliable characteristic of random switching of resistance states under the condition of no external magnetic field and a room temperature is obtained.

In one aspect of the present disclosure, a reconfigurable PUF device based on fully electric field-controlled domain wall motion is provided, comprising: a voltage control layer, upper electrodes, a lower electrode, antiferromagnetic pinning layers, and a magnetic tunnel junction (MTJ). The MTJ includes, from bottom to top, a ferromagnetic reference layer, a potential barrier tunneling layer and a ferromagnetic free layer. The lower electrode is attached to a lower surface of the ferromagnetic reference layer. The upper electrodes are attached to both ends of a lower surface of the ferromagnetic free layer. The upper electrodes and the lower electrode are configured to connect peripheral circuits. The ferromagnetic free layer has a geometrically anisotropic structure to facilitate relaxation movement of magnetic domain walls from a middle portion to both ends. The antiferromagnetic pinning layers are attached to both ends of an upper surface of the ferromagnetic free layer, and magnetic domain walls at both ends of the ferromagnetic free layer are pinned in opposite directions with each other so as to assist nucleation of the magnetic domain walls and prevent the magnetic domain walls from annihilation. The voltage control layer is attached to the upper surface of the ferromagnetic free layer and located between the antiferromagnetic pinning layers at both ends. In the device, an energy potential well is formed in the middle portion of the ferromagnetic free layer by applying a voltage to the voltage control layer to control magnetic anisotropy, and a current is fed into either of the upper electrodes to drive generation of the magnetic domain walls and pin the magnetic domain walls to the potential well. After the voltage is removed, the potential well is lowered so that the magnetic domain walls are in a metastable state, and the magnetic domain walls are randomly moved to one side of the ferromagnetic free layer under the condition of thermal disturbance and the geometric anisotropy, thereby either a high resistance state or a low resistance state is randomly obtained.

In some embodiments, the voltage control layer includes one of the following materials: $HfO_2$, MgO, and SiOx. The upper electrodes include one of the following materials: Ti, Pt, Ag, Au, Pd, Ru, W, Ti alloy, Pt alloy, Ag alloy, Au alloy, Pd alloy, Ru alloy, and W alloy. The lower electrode includes one of the following materials: Ti, Pt, Ag, Au, Pd, Ru, W, Ti alloy, Pt alloy, Ag alloy, Au alloy, Pd alloy, Ru alloy, and W alloy. The antiferromagnetic pinning layers include one of the following materials: PtMn, FeMn, and $Mn_2Au$. The barrier tunneling layer includes one of the following materials: MgO, AlOx. The ferromagnetic free layer and the ferromagnetic reference layer each include any one of the following vertically anisotropic magnetic materials: CoFeB, $Co_2FeAl$, Co, CoFe, $Fe_3GeTe_2$ and $Ni_3GeTe_2$.

In another aspect of the disclosure, a novel memory is provided, comprising the reconfigurable PUF device based on fully electric field-controlled domain wall motion mentioned above.

In yet aspect of the disclosure, a reconfigurable PUF construction method based on regulation of magnetic domain walls is provided, comprising steps of: S1, feeding a nucleation current into either of the upper electrodes of the reconfigurable PUF device based on fully electric field-controlled domain wall motion mentioned above to drive generation and movement of magnetic domain walls in each reconfigurable PUF device, applying a voltage to the voltage control layer of each reconfigurable PUF device to form a low magnetic anisotropy region in a middle portion of each ferromagnetic free layer, and thereby an energy potential well is formed so that the magnetic domain walls are pinned to the middle portion of each ferromagnetic free layer and oscillate randomly around the middle portion of each ferromagnetic free layer under thermal disturbance; S2, removing the voltage applied to the voltage control layer of each reconfigurable PUF device to remove the energy potential well so that the magnetic domain walls at the middle portion are in a metastable state and the magnetic domain walls are randomly moved to one side of each ferromagnetic free layer under the condition of thermal disturbance and geometric anisotropy; S3, feeding, after magnetic domain walls are stabilized on one side of each ferromagnetic free layer, a read current into the lower electrode of each reconfigurable PUF device, and using, among all the reconfigurable PUF devices, a device in which magnetic domain walls are always pinned to the middle portion of the ferromagnetic free layer as a reference device and a device in which magnetic domain walls are randomly moved to one side of the ferromagnetic free layer as a random device, and comparing read current values of the reference device and the random device to obtain a binary information, and then reading the binary information by a comparison output circuit connected to both the reference device and the random device to realize a PUF function; S4, feeding a reset current to drive the magnetic domain walls of all the reconfigurable PUF devices to an initial position; and S5, repeating the steps S1-S4 to realize the reconfigurable PUF.

In some embodiments, a pulse width or amplitude exerted by the nucleation current is lower than a pulse width or amplitude exerted by the reset current to prevent the magnetic domain walls from de-pinning.

In some embodiments, the comparison output circuit comprises a sense amplifier.

In some embodiments, in the step S3, comparing a reference current generated by the reference device with an induced current generated by the random device, and reading, by the sense amplifier, a random binary number as a PUF key to realize the PUF function; wherein, when the reference current is greater than the induced current, the sense amplifier outputs a high-level response, representing a binary number "1"; otherwise, when the reference current is lower than the induced current, the sense amplifier outputs a low-level response, representing a binary number "0".

In another yet aspect of the disclosure, a reconfigurable PUF construction system based on regulation of magnetic domain walls is provided, comprising: a driving and pinning module, configured for: feeding a nucleation current into either of upper electrodes of each reconfigurable PUF device mentioned above to drive generation and movement of magnetic domain walls in each reconfigurable PUF device, and applying a voltage to the voltage control layer of each reconfigurable PUF device to form a low magnetic anisotropy region in a middle portion of each ferromagnetic free layer, and thereby an energy potential well is formed so that the magnetic domain walls are pinned to the middle portion of each ferromagnetic free layer and randomly oscillate around the middle portion of each ferromagnetic free layer under thermal disturbance; a de-pinning module, configured for: removing the voltage onto the voltage control layer of each reconfigurable PUF device to remove the energy potential well so that the magnetic domain walls at the middle portion of each ferromagnetic free layer are in a metastable state, and the magnetic domain walls are de-pinned and randomly moved to one side of each ferromagnetic free layer under the condition of thermal disturbance and geometric anisotropy; a reading module, configured for: feeding, after the magnetic domain walls are stabilized on one side of each ferromagnetic free layer, a read current to the lower electrode of each reconfigurable PUF device, and using, among all the reconfigurable PUF devices, a device in which the magnetic domain walls are always pinned to the middle portion of the ferromagnetic free layer as a reference device and a device in which the magnetic domain walls are randomly moved to one side of the ferromagnetic free layer as a random device, and comparing read current values of the reference device and the random device to obtain a binary information, and then reading the binary information through a comparison output circuit connected to both the reference device and the random device to realize a PUF function; a resetting module, configured for: feeding a reset current to drive the magnetic domain walls of all the reconfigurable PUF devices to an initial position so as to enable erasing of an old PUF command; and a reconfiguration-enabling module, configured for: controlling the driving and pinning module, the de-pinning module, the reading module and a resetting module to be implemented repeatedly and orderly, in order to realize a reconfigurable PUF and form a new key.

In another aspect of the disclosure, a reconfigurable PUF construction system based on regulation of magnetic domain walls is provided, comprising: an array of M×N PUF devices, wherein each unit device structure in the array of M×N PUF devices includes two transistors and a reconfigurable PUF device mentioned above; a first transistor is connected to either of the upper electrodes of the reconfigurable PUF device, and a second transistor is connected to the lower electrode of the reconfigurable PUF device.

In some embodiments, the system may further comprise: a row decoder, a column decoder, a read circuit, and a comparison output circuit; wherein in the array of M×N PUF devices, the row decoder is connected to the gates of the first transistors and the voltage control layers of the reconfigurable PUF devices to control turn-on of the first transistors of devices of any row as well as pinning of the magnetic domain walls; the column decoder is connected to the sources of the first transistors and another upper electrodes, other than the upper electrodes connected with the first transistors, of the reconfigurable PUF devices to provide a fed current to any column, and controls the gates of the second transistors in any column, and controls turn-on and turn-off of a read channel; the read circuit is connected to the sources of the second transistors to provide the read current; and the comparison output circuit implements comparison and random result output.

In yet another aspect of the present disclosure, a computing device is provided. The computing device includes a processor and a memory on which computer program codes are stored. The computer program codes, when being executed by the processor, may cause the processor to perform the reconfigurable PUF construction method based on regulation of magnetic domain walls according to one or more embodiments of the present disclosure.

The present disclosure discloses a reconfigurable PUF device based on fully electric field-controlled domain wall motion, in which an energy potential well is formed in the middle portion of the ferromagnetic free layer by applying a voltage to the voltage control layer to control magnetic anisotropy, and a current is fed into either of the upper electrodes to drive generation of magnetic domain walls and pin the magnetic domain walls to the potential well; after the voltage is removed, the potential well is lowered so that the magnetic domain walls are in a metastable state, and the magnetic domain walls are randomly moved to one side of the ferromagnetic free layer under the condition of thermal disturbance and the geometric anisotropy, thereby either a high resistance state or a low resistance state can be randomly obtained. The device can achieve generation and random movement of the magnetic domain walls by electrical methods, and thus has a highly reliable and reconfigurable characteristic of random switching of resistance states under the condition of no external magnetic field and a room temperature.

BRIEF DESCRIPTION OF THE DRAWINGS

In order to clearly illustrate the technical solutions in the embodiments of the present disclosure, the accompanying drawings that need to be used in the description of the embodiments will be briefly introduced below. Apparently, the figures in the following description are only related to the embodiments of the present disclosure. For those of ordinary skill in the art, other figures can also be obtained according to the provided figures without any creative work.

DETAILED DESCRIPTION

Figure 1:
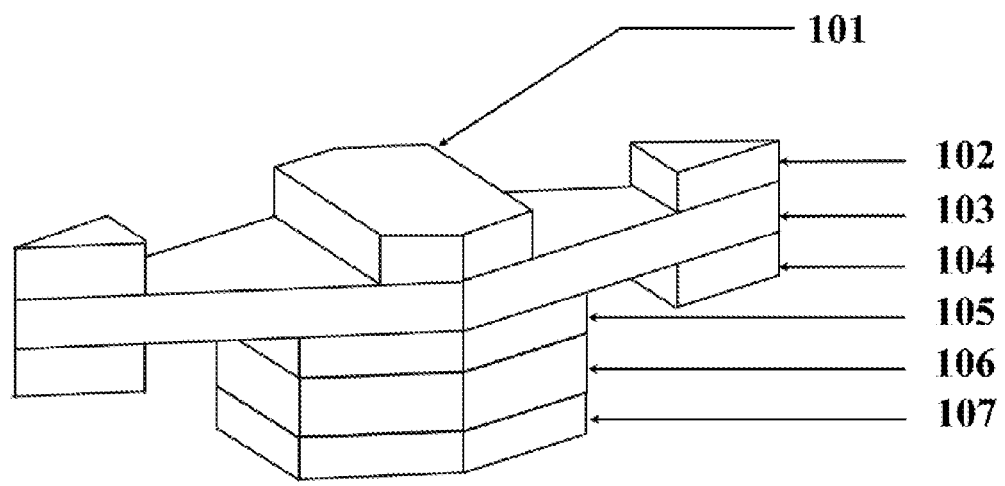
FIG. 1 shows a schematic diagram of a structure of a reconfigurable PUF device based on fully electric field-controlled domain wall motion according to one or more embodiments of the present disclosure.

Hereinafter, the embodiments of the present disclosure will be described with reference to the accompanying drawings. It should be understood, however, that the description thereof is for illustrative purpose only, and is not intended to limit the scope of the present disclosure. Also, descriptions of well-known structures and techniques are omitted in the following description to avoid unnecessarily obscuring the concepts of the present disclosure.

Various structural schematic diagrams according to the embodiments of the present disclosure are illustrated in the accompanying drawings. These figures are not plotted in scale, so some details have been exaggerated for clarity, and some details may be omitted. As for various regions and layers shown in the figures, the shapes thereof as well as their relative sizes and positional relationships are only exemplary, and may be varied slightly in practice due to manufacturing tolerances or technical limitations, and regions or layers with different shapes, sizes and relative positions can be additionally designed as desired by those skilled in the art.

In the context of the present disclosure, when a layer or element is described as being "on" another layer or element, said layer or element can be directly located on said another layer or element or there may be intervening layers or elements therebetween. In addition, if a layer or element is "on" another layer or element in a certain orientation, then in the case that the orientation is reversed, said layer or element can be "beneath" said another layer or element. In the context of the present disclosure, similar or identical components may be designated by the same or similar reference numerals.

In order to better understand the above-mentioned technical solutions, the above-mentioned technical solutions will be described in detail below in conjunction with specific embodiments. It should be understood that the embodiments of the present disclosure and specific features in the embodiments serves as detailed descriptions for the technical solutions of the present disclosure, instead of limitation of the technical solutions of the present disclosure. The embodiments of the present disclosure as well as the technical features in the embodiments may be combined with each other without conflict.

In view of the above problems, the present disclosure provides a reconfigurable PUF device based on fully electric field-controlled domain wall motion. The device is applied on the fields such as protection of property rights, key generation, and system authentication, and is enabled through nucleation, movement, pinning, and de-pinning of magnetic domain walls. It has the characteristics of high speed, low power consumption, integration, security, reliability and uniformity, etc.

A structure of the reconfigurable PUF device based on fully electric field-controlled domain wall motion is shown in FIG. 1, which includes a voltage control layer 101, an upper electrode 104, a lower electrode 107, an antiferromagnetic pinning layer 102, and a magnetic tunnel junction MTJ. The MTJ includes, from bottom to top, a ferromagnetic reference layer 106, a barrier tunneling layer 105, and a ferromagnetic free layer 103.

In some embodiments, the lower electrode 107 is attached to a lower surface of the ferromagnetic reference layer 106, and there are two upper electrodes 104, which are respectively attached to both ends of a lower surface of the ferromagnetic free layer 103. The upper electrodes 104 and the lower electrode 107 are configured to connect peripheral circuits. There are also two antiferromagnetic pinning layers 102, which are respectively attached to both ends of an upper surface of the ferromagnetic free layer 103. The voltage control layer 101 is attached to the upper surface of the ferromagnetic free layer 103 and located between the two antiferromagnetic pinning layers 102 at both ends, for example, locating in a middle portion of the upper surface of the ferromagnetic free layer 103.

In the reconfigurable PUF device based on fully electric field-controlled domain wall motion, an energy potential well is formed in the middle portion of the ferromagnetic free layer 103 by applying a voltage to the voltage control layer 101 to control magnetic anisotropy, and a nucleation current is fed into either of upper electrodes 104 to drive generation of magnetic domain walls and pin the magnetic domain walls to the potential well; after the voltage is removed, the potential well is lowered so that the magnetic domain walls are in a metastable state, and the magnetic domain walls are randomly moved to one side of the ferromagnetic free layer 103 under the condition of thermal disturbance and the geometric anisotropy, thereby either a high resistance state or a low resistance state can be randomly obtained. The device can achieve generation and random movement of the magnetic domain walls by electrical methods, and thus has a highly reliable and reconfigurable characteristic of random switching of resistance states under the condition of no external magnetic field and a room temperature.

In some embodiments, the ferromagnetic free layer 103 is a structure having geometric shape anisotropy to facilitate relaxation movement of the magnetic domain walls from the middle portion of the ferromagnetic free layer 103 to both ends. For example, when the magnetic domain walls are de-pinned, the magnetic domain walls relax to a side with lower energy due to thermal disturbance and geometric anisotropy, realizing random magnetization switching. It is worth noting that although the magnetic domain walls relax to the side with lower energy, in the case that the energy at both ends of the ferromagnetic free layer 103 is much lower due to thermal disturbance and geometric anisotropy, which end that the magnetic domain walls move to is uncertain. Therefore, random high or low resistance state can be obtained so that random magnetization switching is achieved. There are a plurality of structures that have geometric shape anisotropy, for example, the ferromagnetic free layer 103 is configured to be a rhombus structure with a middle portion wider than both ends, or a rectangular structure; or polygonal structures such as a hexagon and an octagon; an elliptical structure.

Either of upper electrodes 104 is fed with a nucleation current to drive generation and movement of magnetic domain walls. The voltage control layer 101 is located at the middle portion of the ferromagnetic free layer 103, and a voltage is applied to the voltage control layer 101 to form in the middle portion of the ferromagnetic free layer 103 a potential well that pins the magnetic domain walls, so that an effect of pinning the magnetic domain wall is achieved. In some embodiments, a voltage is applied to the voltage control layer 101 to form a low magnetic anisotropy region in the middle portion of the ferromagnetic free layer 103 so as to form an energy potential well, as a result of which the magnetic domain walls are pinned to the middle portion of the ferromagnetic free layer 103 and oscillates randomly around the middle portion of the ferromagnetic free layer 103 under thermal disturbance, and thereby the effect of regulating the magnetic anisotropy in the middle portion of the ferromagnetic free layer 103 by electrical methods is achieved. The antiferromagnetic pinning layers 102 at both ends of the ferromagnetic free layer 103 serve as initial nucleation regions and edge pinning regions of the magnetic domain walls, and the magnetic domain walls at both ends of the ferromagnetic free layer 103 are pinned in opposite directions to assist nucleation of the magnetic domain walls and prevent the magnetic domain walls from annihilation. After the voltage is removed, the magnetic domain walls are de-pinned due to removal of the energy potential well. At this time, the magnetic domain walls at the middle portion of the ferromagnetic free layer 103 are in a metastable state, and the energy in the middle portion of the ferromagnetic free layer 103 is higher than the energy at both ends, so that after de-pinning, the magnetic domain walls are randomly moved to one side of the ferromagnetic free layer 103 under the condition of thermal disturbance and geometric anisotropy, thereby either the high resistance state or the low resistance state is obtained randomly. In some embodiments, since the ferromagnetic free layer 103 is perpendicular to an in-plane easy magnetization direction, it has two inherently stable magnetization directions, i.e., upward and downward. A magnetization direction can be switched between these two directions through current regulation, and the magnetization direction of the ferromagnetic free layer 103 plays a role of regulation and extraction of high or low resistance. If the magnetization direction of the ferromagnetic free layer 103 is mainly parallel to a magnetization direction of the ferromagnetic reference layer 106 (that is, the magnetization direction of the ferromagnetic free layer 103 and the magnetization direction of the ferromagnetic reference layer 106 are the same), then the device is in the low resistance state; while the magnetization direction of the ferromagnetic free layer 103 is mainly antiparallel to the magnetization direction of the ferromagnetic reference layer 106 (that is, the magnetization direction of the ferromagnetic free layer 103 is opposite to the magnetization direction of the ferromagnetic reference layer 106), then the device is in the high resistance state. In this way, the resistance state can be read in accordance with the current.

The voltage control layer 101 includes one of the following materials: $HfO_2$, MgO, and $SiO_x$. The upper electrodes include one of the following materials: Ti, Pt, Ag, Au, Pd, Ru, W, Ti alloy, Pt alloy, Ag alloy, Au alloy, Pd alloy, Ru alloy, and W alloy. The lower electrode includes one of the following materials: Ti, Pt, Ag, Au, Pd, Ru, W, Ti alloy, Pt alloy, Ag alloy, Au alloy, Pd alloy, Ru alloy, and W alloy. The antiferromagnetic pinning layers include one of the following materials: PtMn, FeMn, and $Mn_2Au$. The barrier tunneling layer includes one of the following materials: MgO, AlOx. The ferromagnetic free layer and the ferromagnetic reference layer each include any one of vertically anisotropic magnetic materials: CoFeB, $Co_2FeAl$, Co, CoFe, $Fe_3GeTe_2$ and $Ni_3GeTe_2$.

Figure 2A:
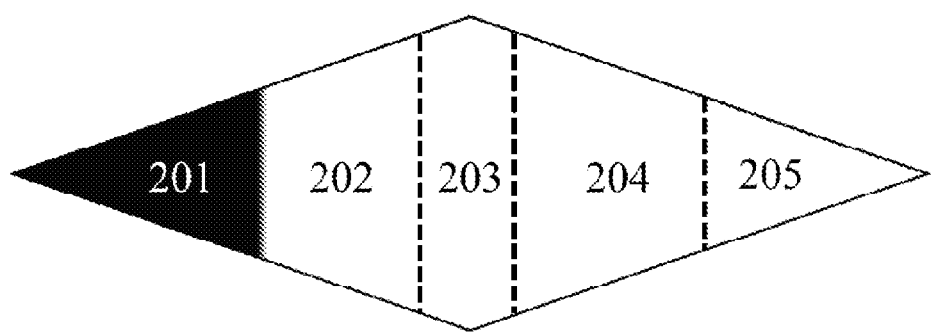
FIG. 2A shows a schematic diagram of sub-regions of a ferromagnetic free layer.

FIG. 2A shows a schematic diagram of sub-regions of a ferromagnetic free layer. The ferromagnetic free layer is made up of a single material and can be divided into five different regions in terms of varied stacking relationships with other layers: 201 refers to a first antiferromagnetic pinning region where one side of the ferromagnetic free layer overlaps with one antiferromagnetic pinning layer and 205 refers to a second antiferromagnetic pinning region where another side of the ferromagnetic free layer overlaps with another antiferromagnetic pinning layer, and the first antiferromagnetic pinning region and the second antiferromagnetic pinning region maintain fixed and opposite magnetization directions with each other; 203 refers to a voltage control region where the ferromagnetic free layer 103 overlaps with the voltage control layer 101 and where the energy potential well or the potential barrier is formed through voltage change to enable pinning or de-pinning of the magnetic domain walls; 202 refers to a first relaxation region of magnetic domain wall and 204 refers to a second relaxation region of magnetic domain wall, and when the magnetic domain walls are de-pinned, due to thermal disturbance and geometric anisotropy, the magnetic domain walls relax to the first relaxation region of magnetic domain wall 202 or the second relaxation region of magnetic domain wall 204 that has the lower energy, so that random magnetization switching is enabled.

Figure 2B:
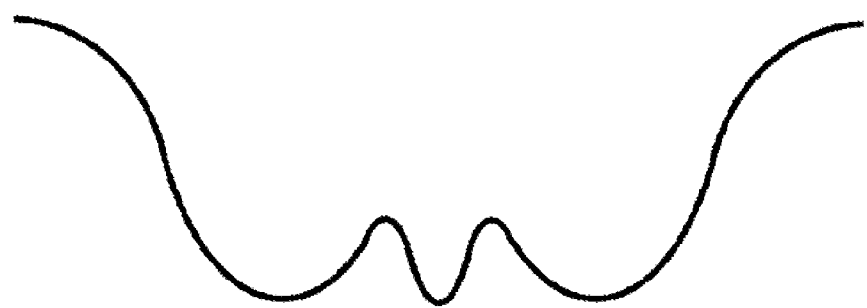
FIG. 2B shows a first schematic diagram illustrating energy barrier transitions of five sub-regions in FIG. 2A in the process of random switching.
Figure 2C:
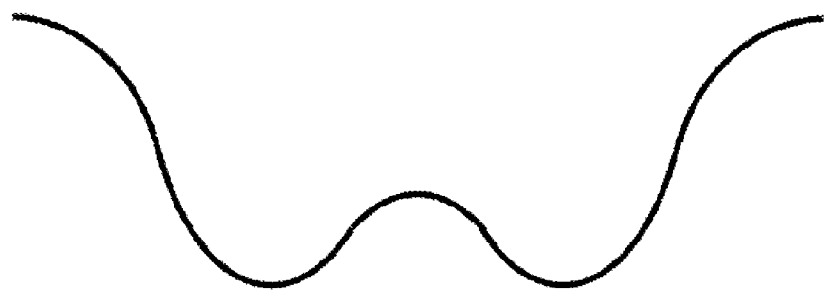
FIG. 2C shows a second schematic diagram illustrating energy barrier transitions of five sub-regions in FIG. 2A in the process of random switching.

FIG. 2B and FIG. 2C show schematic diagrams illustrating energy barrier transitions of five sub-regions in FIG. 2A in the process of random switching. The energy in the process of the nucleation and the pinning in an initial stage is shown in FIG. 2B. At this moment, the first antiferromagnetic pinning region 201 and the second antiferromagnetic pinning region 205 have energy barriers due to the existence of the antiferromagnetic pinning layer, while in the voltage control region 203, the magnetic anisotropy is weakened due to the application of the voltage so that an energy potential well has been generated in the voltage control region 203. Upon the nucleation current of about $5 \times 10^8$ $A/cm^2$ and 0.175 ns is applied to either of upper electrodes (the structure as well as the operations of the device are symmetrical, for easy description, the current is fed from the upper electrode on the left in FIG. 1 by default), the current will nucleates at the boundary of the first antiferromagnetic pinning region 201 and a first relaxation region of magnetic domain wall 202 and drives the magnetic domain walls to a position of the potential well of the voltage control region 203. With the influence of thermal disturbance, the magnetic domain walls pinned at the position of the potential well oscillate left and right in the potential well of the voltage control region 203, and it cannot be predicted accurately.

When it is required to generate a PUF key, the voltage applied to the voltage control region 203 is removed, and the potential well at the voltage control region 203 in the ferromagnetic free layer disappears at this moment. Due to the influence of geometric anisotropy, the energy at the first relaxation region of magnetic domain wall 202 and the second relaxation region of magnetic domain wall 204 are lower than that of the voltage control region 203. Therefore, the magnetic domain walls that randomly fluctuate formerly in the potential well relax randomly to one of the regions, and eventually stabilizes at one of them.

These above relate to the specific structure and principle of the reconfigurable PUF device based on fully electric field-controlled domain wall motion. The reconfigurable PUF device based on fully electric field-controlled domain wall motion can achieve generation and random movement of magnetic domain walls by electrical methods, and a magnetic field is not required for the generation and random movement of magnetic domain walls, and thus the reconfigurable PUF device has a highly reliable characteristic of random switching of resistance states under the condition of no external magnetic field and a room temperature.

In another aspect of the present disclosure, a novel memory is disclosed, which includes a reconfigurable PUF device based on fully electric field-controlled domain wall motion, wherein de-pinning of the magnetic domain walls is inherently random, which presents a good development potential in the field of information security.

Upon the reconfigurable PUF device based on fully electric field-controlled domain wall motion has been completed, a changeless PUF is vulnerable to external modeling attacks, which increases the risk of data being deciphered. As such, an embodiment of the present disclosure discloses a reconfigurable PUF construction method based on regulation of magnetic domain wall, in which the highly reliable characteristic of random switching of resistance states under the condition of no external magnetic field and a room temperature of the above-mentioned reconfigurable PUF device based on fully electric field-controlled domain wall motion is utilized so that a reconfigurable PUF can be realized only by electrical methods to resist external modeling attacks and increase the security of data encryption.

The principle of the embodiment of the present disclosure is in that: using a device in which magnetic domain walls are fixedly pinned to the middle portion as a reference device, and obtaining a corresponding response by comparing outputs through a sense amplifier. In addition, this configuration can be regenerated by regulating random numbers by electrical methods so that reconfigurable PUF function is realized.

The reconfigurable PUF construction method based on regulation of magnetic domain walls according to an embodiment of the present disclosure may include steps S1 to S5.

In step S1, a nucleation current is fed into either of upper electrodes of the reconfigurable PUF device based on fully electric field-controlled domain wall motion as described in each of various above-mentioned embodiments to drive generation and movement of magnetic domain walls in each reconfigurable PUF device based on fully electric field-controlled domain wall motion, and a voltage is applied to the voltage control layer of each reconfigurable PUF device based on fully electric field-controlled domain wall motion to form a low magnetic anisotropy region in the middle portion of each ferromagnetic free layer. As a result, an energy potential well is formed so that the magnetic domain walls are pinned to the middle portion of each ferromagnetic free layer and oscillate randomly around the middle portion of each ferromagnetic free layer under thermal disturbance.

In step S2, the voltage applied on the voltage control layer of each reconfigurable PUF device based on fully electric field-controlled domain wall motion is removed to remove the energy potential well so that the magnetic domain walls at the middle portion of each ferromagnetic free layer are in a metastable state and the magnetic domain walls are randomly moved to one side of each ferromagnetic free layer under the condition of thermal disturbance and geometric anisotropy.

In step S3, after the magnetic domain walls are stabilized on one side of each ferromagnetic free layer, a read current is fed into the lower electrode of each reconfigurable PUF device based on fully electric field-controlled domain wall motion; and, among all the reconfigurable PUF devices based on fully electric field-controlled domain wall motion, a device in which magnetic domain walls are always pinned to the middle portion of the ferromagnetic free layer is used as a reference device, and a device in which magnetic domain walls are randomly moved to one side of the ferromagnetic free layer is used as a random device. Read current values of the reference device and the random device are compared to obtain a binary information. The binary information is read by a comparison output circuit connected to both the reference device and the random device to realize a PUF function.

In step S4, a reset current is fed to drive the magnetic domain walls of all the reconfigurable PUF devices based on fully electric field-controlled domain wall motion to initial positions. The initial position refers to an initial position of generation of magnetic domain walls. If the magnetic domain walls were generated in the upper electrode at the left in FIG. 1, then the magnetic domain walls are driven to the upper electrode at the left once the reset current is fed.

In step S5, the steps S1-S4 are repeated to realize the reconfigurable PUF function.

In some embodiments, a reset current is fed into either of upper electrodes, and then the current flows through a heavy metal layer so that the magnetic domain walls are driven to reset by spin-orbit torque.

In some embodiments, a pulse width or amplitude exerted by the nucleation current is lower than a pulse width or amplitude exerted by the reset current to prevent the magnetic domain walls from de-pinning.

In some embodiments, the comparison output circuit includes a sense amplifier. Therefore, in the step S3, a reference current generated by the reference device and an induced current generated by the random device are compared with each other, and a random binary number is read by the sense amplifier to be used as a PUF key, so that the PUF function is realized. In this case, when the reference current is greater than the induced current, the sense amplifier outputs a high-level response, representing a binary number "1"; otherwise, when the reference current is lower than the induced current, the sense amplifier outputs a low-level response, representing a binary number "0". In some embodiments, if the random device is in a high resistance, then the induced current is read to be low, and if the random device is in a low resistance, then the induced current is read to be high; in the case that the low induced current is lower than the reference current, or that the high induced current is higher than the reference current, then the sense amplifier compares and outputs "0" or "1" in the circuit, respectively.

Figure 3:
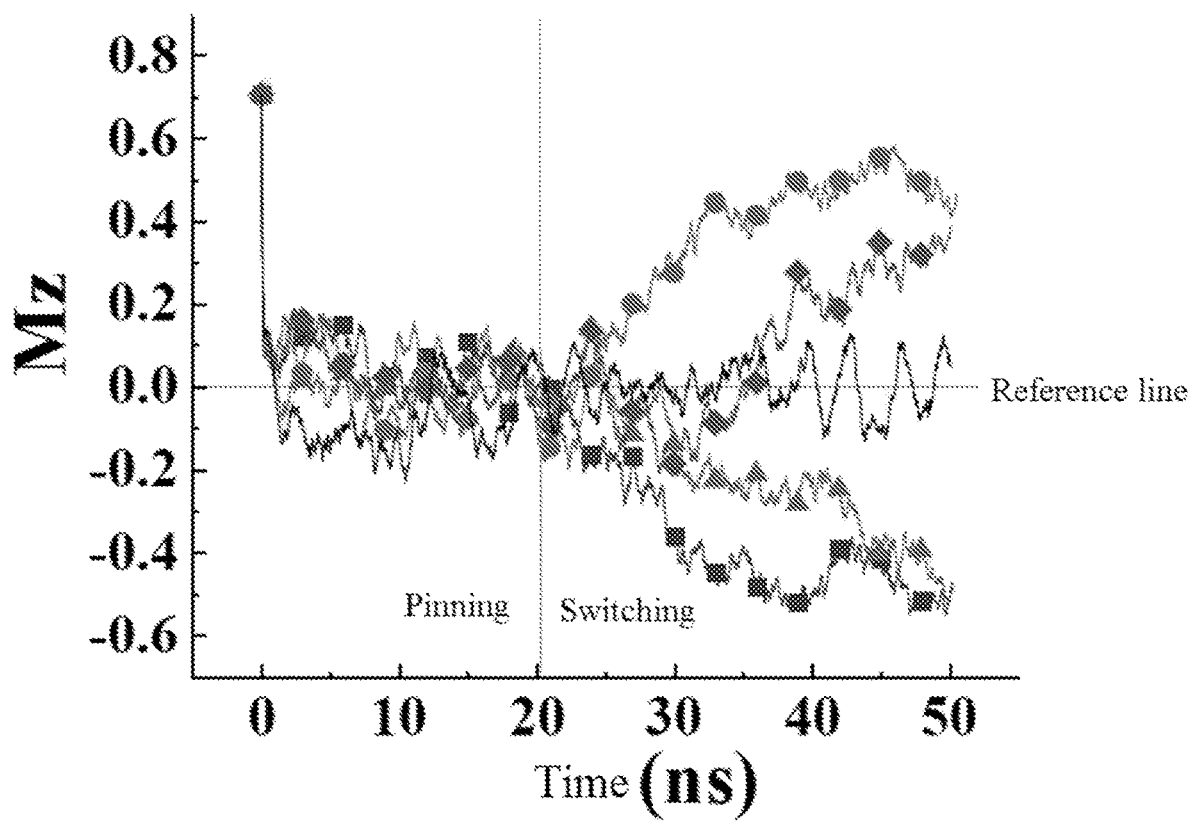
FIG. 3 shows a random number generation process under thermal disturbance according to one or more embodiments of the present disclosure.

In some embodiments, the device can be configured to randomly generate a PUF key to guarantee the data security. FIG. 3 shows the processes of random generation of PUF keys, and change of perpendicular magnetization (Mz) of materials in varied processes. The four dotted-line curves in the FIG. 3 illustrate random switching processes of four identical devices therein. In the phase of 0-0.175 ns, the current drives nucleation of the magnetic domain walls and drives the magnetic domain wall to a central voltage control region. In the phase of 0.175-20 ns, the magnetic domain walls are pinned to the middle portion of the ferromagnetic free layer and oscillate randomly under the influence of thermal disturbance. Starting from 20 ns, the voltage applied to the voltage control region is removed, and the magnetic domain walls in the potential well are de-pinned and tend to a side randomly, which appears to be +1 or −1 on the Mz. At this time, a reference device in which the magnetic domain walls are always pinned to the middle portion is taken, and states of other devices are read for comparison. Magnetization of the reference device is as shown in a reference line in FIG. 3, and an Mz value thereof fluctuates over and over again around a center of 0. Therefore, a random binary number can be generated and read as a PUF key by comparing the resistances of the random device and the reference device.

Figure 4:
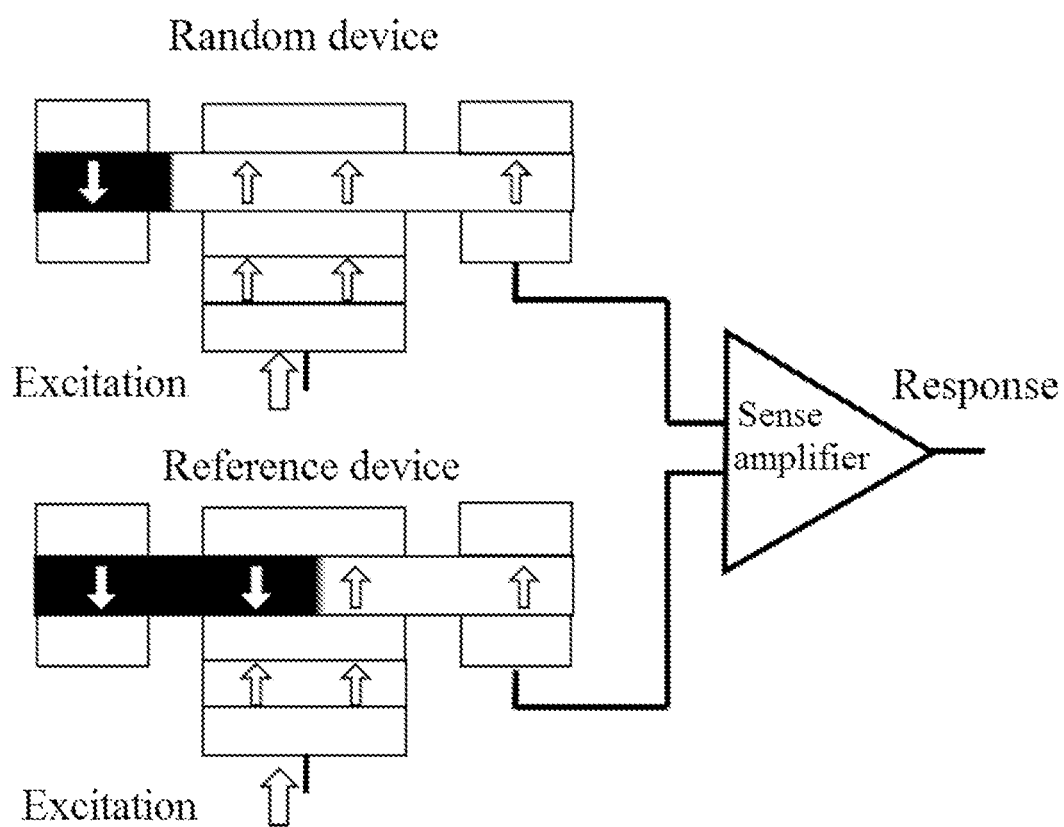
FIG. 4 shows excitation and response of physical unclonable function (PUF) according to one or more embodiments of the present disclosure.

As the comparison of resistances can also be presented in a manner of current, an excitation input and a response output of the PUF function of the device are as shown in FIG. 4. A read current serving as the excitation is fed into the lower electrode of the reference device and the random device to generate an induced current and a reference current, which are input together to the sense amplifier. When the reference current is greater than the induced current, the amplifier outputs a high-level response, representing a binary number "1"; otherwise, when the reference current is lower than the induced current, the amplifier outputs a low-level response, representing a binary number "0". Through micromagnetic simulation, the current applied during the excitation-response process will not change the positions where the magnetic domain walls are located, and an intra-HD (Hamming distance) can be close to an ideal value of 0%, so that its reliability can be ensured. Through simulation using 56 devices, a result shows that the device has a uniformity of 51.79% and an inter-HD of 52.38% that is close to 50% of the ideal value, thereby showing the randomness of the device for key generation.

Figure 5:
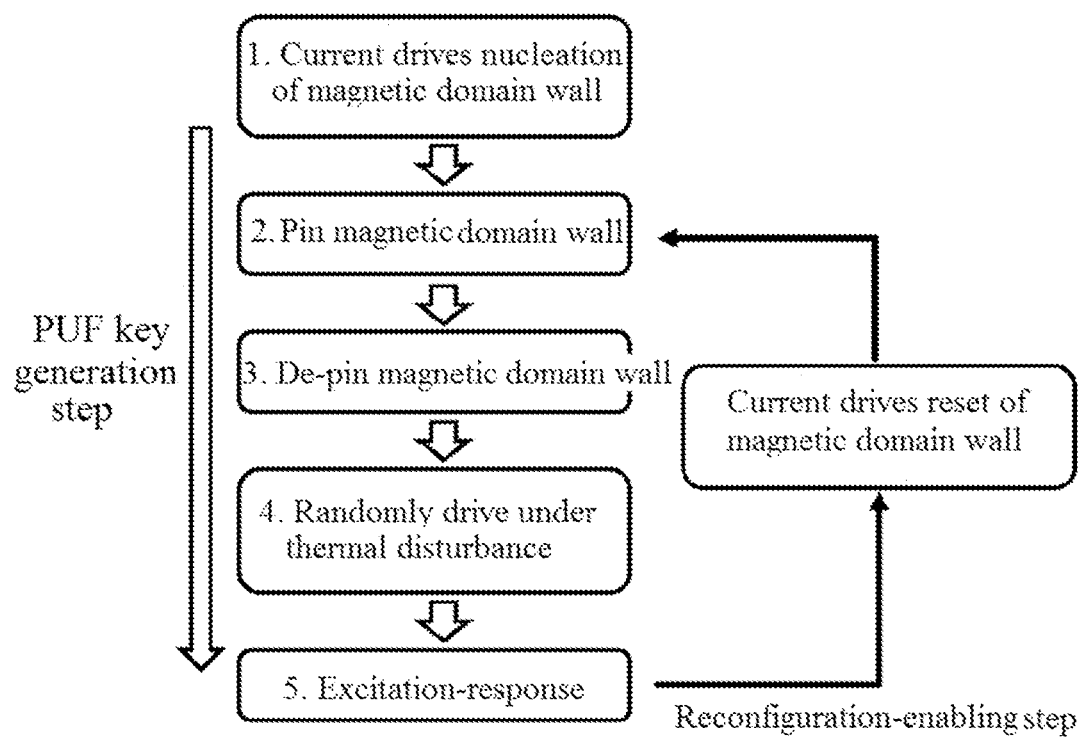
FIG. 5 shows a flow chart of implementation of a reconfigurable PUF according to one or more embodiments of the present disclosure.

The flow of implementation of the device's reconfigurable physical unclonable function is shown in FIG. 5. First, a nucleation current is fed into either of the upper electrodes to drive nucleation and movement of magnetic domain walls. Then, a voltage is applied to the voltage control layer to form a low magnetic anisotropy region in the middle portion of the ferromagnetic free layer so as to form an energy potential well, as a result of which the magnetic domain walls are pinned to the middle portion of the ferromagnetic free layer and oscillate randomly around the middle portion under thermal disturbance. Third, after the nucleation current is applied for 10-20 ns, the voltage onto the voltage control layer is removed so that the energy potential well is removed and the magnetic domain walls at the middle portion of the ferromagnetic free layer are de-pinned, in a metastable state, and randomly moved to one side of the ferromagnetic free layer under the condition of thermal disturbance and geometric anisotropy. Then, after the magnetic domain walls are stabilized on one side of the ferromagnetic free layer, a read current is fed through the lower electrode. A device in which the magnetic domain walls are stabilized on one side of the ferromagnetic free layer is used as a random device and a device in which the magnetic domain walls are always pinned to the middle portion is used as a reference device, and read current values of the random device and the reference device are compared to obtain a binary information. The binary information is read through the sense amplifier. In this way, the generation of PUF key and the excitation-response function are implemented. In a step of reconfiguration-enabling, a reset current drives the magnetic domain walls of all devices to initial positions. By repeating the above steps, reformation of key and a new current response-excitation process can be enabled so that the reconfigurable PUF is achieved and the usage security of the device is improved.

A reconfigurable PUF construction system based on regulation of magnetic domain walls according to an embodiment of the present disclosure may include a driving and pinning module, a de-pinning module, a reading module, a resetting module, and a reconfiguration-enabling module.

The driving and pinning module is configured for: feeding a nucleation current into either of the upper electrodes of each reconfigurable PUF device based on fully electric field-controlled domain wall motion according to the above-mentioned embodiment, to drive generation and movement of magnetic domain walls in each reconfigurable PUF device based on electric field controlled domain wall motion, applying a voltage to the voltage control layer of each reconfigurable PUF device based on fully electric field-controlled domain wall motion to generate a low magnetic anisotropy region in the middle portion of each ferromagnetic free layer so as to form an energy potential well, as a result of which the magnetic domain walls are pinned to the middle portion and randomly oscillate around the middle portion of the ferromagnetic free layer under thermal disturbance. Of course, the magnetic domain walls in the same PUF device oscillate around the middle portion of the ferromagnetic free layer of the same PUF device, and do not oscillate around the ferromagnetic free layer of other PUF devices.

The de-pinning module is configured for: removing the voltage applied to the voltage control layer of each reconfigurable PUF device based on fully electric field-controlled domain wall motion to remove the energy potential well so that the magnetic domain walls at the middle portion are in a metastable state and the magnetic domain walls are de-pinned and randomly moved to one side of each ferromagnetic free layer under the condition of thermal disturbance and geometric anisotropy, wherein the device one side of which the magnetic domain walls are moved to is used as a random device.

The reading module is configured for: after the magnetic domain walls are stabilized on one side of various ferromagnetic free layers, feeding a read current to the lower electrode of each reconfigurable PUF device based on fully electric field-controlled domain wall motion; using, among all the reconfigurable PUF devices based on fully electric field-controlled domain wall motion, a device in which the magnetic domain walls are always pinned to the middle portion of the ferromagnetic free layer as a reference device and a device in which the magnetic domain walls are randomly moved to one side of the ferromagnetic free layer as a random device, and comparing read current values of the reference device and the random device to obtain a binary information; and then reading the binary information through a comparison output circuit connected to both the reference device and the random device to realize the PUF function. The comparison output circuit includes a sense amplifier.

The resetting module is configured for: feeding a reset current to drive the magnetic domain walls of all the reconfigurable PUF devices based on fully electric field-controlled domain wall motion to initial positions so as to enable erasing of an old PUF command. In some embodiments, the reset current is fed into either of the upper electrodes.

The reconfiguration-enabling module is configured for: controlling the driving and pinning module, the de-pinning module, the reading module and the resetting module to be implemented repeatedly and orderly, so as to realize the reconfigurable PUF and form a new key.

Figure 6:
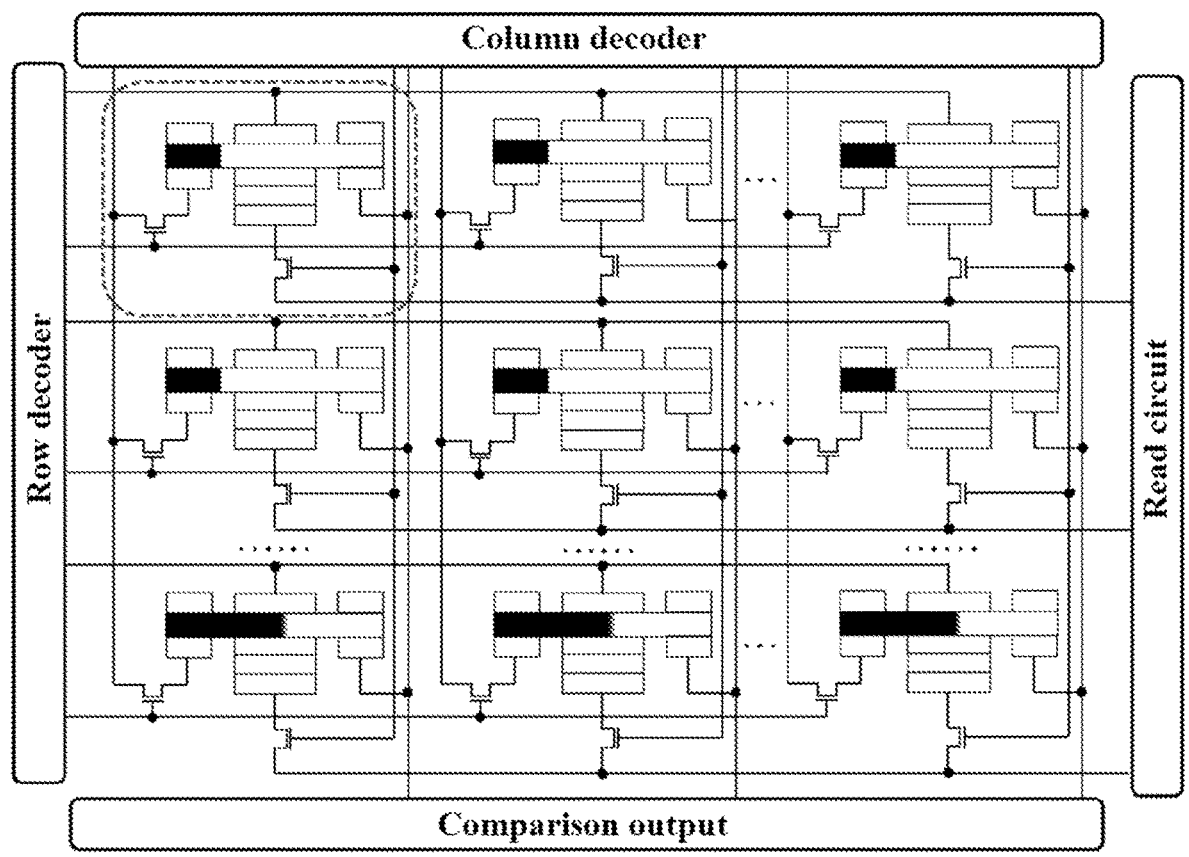
FIG. 6 shows an array structure of a PUF system according to one or more embodiments of the present disclosure.

In another aspect of the present disclosure, a reconfigurable PUF construction system based on regulation of magnetic domain walls is provided, which is described specifically from the perspective of underlying structure. FIG. 6 shows an array integration structure of the devices. In order to reduce array gating operations and leakage current during the operations and to reduce energy consumption, in the present disclosure a unit device structure is designed in which two transistors are allocated with one device, and an array of N×M PUF devices is formed thereby, where N and M are both ≥1 and positive integers. Each unit device structure in the array of M×N PUF devices implements gating in the array, random number generation operation and result reading.

In some embodiments, the unit device structure includes: two transistors and a reconfigurable PUF device as described in the above embodiments. The first transistor is connected to either of the upper electrodes of the reconfigurable PUF device, and controls the current drive of the device. The second transistor is connected to the lower electrode of the reconfigurable PUF device, and controls the excitation input and the response output. The transistors are connected to peripheral circuits to control a drive and pinning mode, a de-pinning mode, a reading mode, a resetting mode, and a reconfiguration-enabling mode of the device.

In some embodiments, the system further includes: a row decoder, a column decoder, a read circuit, and a comparison output circuit.

In some embodiments, in the array of M×N PUF devices, the row decoder is connected to the gates of the first transistors and the voltage control layers of the reconfigurable PUF devices based on fully electric field-controlled domain wall motion, and controls turn-on of the first transistors of the devices of any row as well as voltage application of the voltage control regions so as to control pinning of the magnetic domain walls. The column decoder is connected to the sources of the first transistors and to another upper electrodes, other than the upper electrodes connected with the first transistors, of the reconfigurable PUF devices based on fully electric field-controlled domain wall motion, so that a circuit path is formed to provide feeding of nucleation current into any column. It is worth noting that, the first transistor and the column decoder are respectively connected to the two upper electrodes of the reconfigurable PUF device based on fully electric field-controlled domain wall motion.

In addition, the column decoder controls the gates of the second transistors in any column, and controls turn-on and turn-off of a read channel. The read circuit is connected to the sources of the second transistors to provide a read current for applying an excitation. The comparison output circuit implements comparison and random result output. In some embodiments, after an excitation is applied by the readout circuit, response signals are output according to an induced current and a reference current through the comparison output circuit connected to the upper electrode.

In some embodiments, the comparison output circuit includes a sense amplifier, by means of which comparison and random result output are implemented.

In yet another aspect of the present disclosure, a computing device is provided. The computing device includes a processor and a memory on which computer program codes are stored. The computer program codes, when being executed by the processor, may cause the processor to perform the reconfigurable PUF construction method based on regulation of magnetic domain walls according to one or more embodiments of the present disclosure.

The technical solutions in the above-mentioned embodiments of the present disclosure have at least the following technical effects or advantages.

The reconfigurable PUF device based on fully electric field-controlled domain wall motion provided by the present disclosure can enable nucleation and movement of the magnetic domain walls by using a sub-nanosecond pulse voltage so that the process of random number generation has an operation speed of nanosecond-level, and the processes of random number generation and data retention do not consume additional energy, and thereby a design of equipping with a read circuit is conducive to realization of fast and ultra-low power dissipation PUF, which meets the need of encrypting data on edge side of a terminal.

After a random key has been generated, the reconfigurable PUF device based on fully electric field-controlled domain wall motion provided by the present disclosure retains at one side with lower energy, which can effectively resist fluctuations in temperature and reading window, and greatly reduce a possibility of data error; and spintronic devices have higher durability than other nonvolatile memristors, thereby increasing the reliability of PUF devices.

The reconfigurable PUF device based on fully electric field-controlled domain wall motion provided by the present disclosure adopts domain wall motion, and utilizes nonlinearity of domain wall motion in the process of key generation to effectively resist external modeling attacks, thereby increasing the security of data encryption.

The reconfigurable PUF device based on fully electric field-controlled domain wall motion provided by the present disclosure can generate a new key by the same drive mode after reset, and thus achieves the reconfigurable PUF function without increasing operation complexity of the device, thereby further increasing the security of data encryption.

Apparently, those skilled in the art can make various modifications and variations to the present disclosure without departing from the spirit and scope of the present disclosure. Thus, provided that such modifications and variations of the present disclosure fall within the scope of the claims of the present disclosure and their equivalents, the present disclosure is also intended to cover such modifications and variations.

What is claimed is:

1. A reconfigurable PUF device based on fully electric field-controlled domain wall motion, comprising: a voltage control layer, upper electrodes, a lower electrode, antiferromagnetic pinning layers, and a magnetic tunnel junction (MTJ), wherein, the MTJ includes, from bottom to top, a ferromagnetic reference layer, a potential barrier tunneling layer and a ferromagnetic free layer;

the lower electrode is attached to a lower surface of the ferromagnetic reference layer; the upper electrodes are attached to both ends of a lower surface of the ferromagnetic free layer; and the upper electrodes and the lower electrode are configured to connect peripheral circuits;

the ferromagnetic free layer has a geometrically anisotropic structure to facilitate relaxation movement of magnetic domain walls from a middle portion to both ends; the antiferromagnetic pinning layers are attached to both ends of an upper surface of the ferromagnetic free layer, and magnetic domain walls at both ends of the ferromagnetic free layer are pinned in opposite directions so as to assist nucleation of the magnetic domain walls and prevent the magnetic domain walls from annihilation;

the voltage control layer is attached to the upper surface of the ferromagnetic free layer and located between the antiferromagnetic pinning layers at both ends; and in the device, an energy potential well is formed in the middle portion of the ferromagnetic free layer by applying a voltage to the voltage control layer to control magnetic anisotropy, and a current is fed into either of the upper electrodes to drive generation of the magnetic domain walls and pin the magnetic domain walls to the potential well; after the voltage is removed, the potential well is lowered so that the magnetic domain walls are in a metastable state, and the magnetic domain walls are randomly moved to one side of the ferromagnetic free layer under the condition of thermal disturbance and the geometric anisotropy, thereby either a high resistance state or a low resistance state is randomly obtained.

2. The reconfigurable PUF device based on fully electric field-controlled domain wall motion according to claim 1, wherein, the voltage control layer includes one of the following materials: $HfO_2$, MgO, and SiOx;

the upper electrodes include one of the following materials: Ti, Pt, Ag, Au, Pd, Ru, W, Ti alloy, Pt alloy, Ag alloy, Au alloy, Pd alloy, Ru alloy, and W alloy;

the lower electrode includes one of the following materials: Ti, Pt, Ag, Au, Pd, Ru, W, Ti alloy, Pt alloy, Ag alloy, Au alloy, Pd alloy, Ru alloy, and W alloy;

the antiferromagnetic pinning layers include one of the following materials: PtMn, FeMn, and $Mn_2Au$;

the barrier tunneling layer includes one of the following materials: MgO, AlOx; and the ferromagnetic free layer and the ferromagnetic reference layer each include any one of the following vertically anisotropic magnetic materials: CoFeB, $Co_2FeAl$, Co, CoFe, $Fe_3GeTe_2$ and $Ni_3GeTe_2$.

3. A reconfigurable PUF construction method based on regulation of magnetic domain walls, comprising steps of:

S1, feeding a nucleation current into either of the upper electrodes of each reconfigurable PUF device based on fully electric field-controlled domain wall motion according to claim 1 to drive generation and movement of magnetic domain walls in each reconfigurable PUF device based on fully electric field-controlled domain wall motion, applying a voltage to the voltage control layer of each reconfigurable PUF device based on fully electric field-controlled domain wall motion to form a low magnetic anisotropy region in a middle portion of each ferromagnetic free layer, and thereby an energy potential well is formed so that the magnetic domain walls are pinned to the middle portion of each ferromagnetic free layer and oscillate randomly around the middle portion of each ferromagnetic free layer under thermal disturbance;

S2, removing the voltage applied to the voltage control layer of each reconfigurable PUF device based on fully electric field-controlled domain wall motion to remove the energy potential well so that the magnetic domain walls at the middle portion are in a metastable state and the magnetic domain walls are randomly moved to one side of each ferromagnetic free layer under the condition of thermal disturbance and geometric anisotropy;

S3, feeding, after magnetic domain walls are stabilized on one side of each ferromagnetic free layer, a read current into the lower electrode of each reconfigurable PUF device based on fully electric field-controlled domain wall motion, and using, among all the reconfigurable PUF devices based on fully electric field-controlled domain wall motion, a device in which magnetic domain walls are always pinned to the middle portion of the ferromagnetic free layer as a reference device and a device in which magnetic domain walls are randomly moved to one side of the ferromagnetic free layer as a random device, and comparing read current values of the reference device and the random device to obtain a binary information, and then reading the binary information by a comparison output circuit connected to both the reference device and the random device to realize a PUF function;

S4, feeding a reset current to drive the magnetic domain walls of all the reconfigurable PUF devices based on fully electric field-controlled domain wall motion to initial positions; and S5, repeating the steps S1-S4 to realize the reconfigurable PUF.

4. The reconfigurable PUF construction method based on regulation of magnetic domain walls according to claim 3, wherein a pulse width or amplitude exerted by the nucleation current is lower than a pulse width or amplitude exerted by the reset current to prevent the magnetic domain walls from de-pinning.

5. The reconfigurable PUF construction method based on regulation of magnetic domain walls according to claim 3, wherein the comparison output circuit comprises a sense amplifier.

6. The reconfigurable PUF construction method based on regulation of magnetic domain walls according to claim 5, wherein, in the step S3, comparing a reference current generated by the reference device with an induced current generated by the random device, and reading, by the sense amplifier, a random binary number as a PUF key to realize the PUF function; wherein, when the reference current is greater than the induced current, the sense amplifier outputs a high-level response, representing a binary number "1"; otherwise, when the reference current is lower than the induced current, the sense amplifier outputs a low-level response, representing a binary number "0".

7. A reconfigurable PUF construction system based on regulation of magnetic domain walls, comprising: an array of M×N PUF devices, wherein each unit device structure in the array of M×N PUF devices includes two transistors and a reconfigurable PUF device based on fully electric field-controlled domain wall motion according to claim 1; a first transistor is connected to either of the upper electrodes of the reconfigurable PUF device based on fully electric field-controlled domain wall motion, and a second transistor is connected to the lower electrode of the reconfigurable PUF device based on fully electric field-controlled domain wall motion.

8. The system according to claim 7, further comprising: a row decoder, a column decoder, a read circuit, and a comparison output circuit;
   wherein in the array of M×N PUF devices, the row decoder is connected to the gates of the first transistors and the voltage control layers of the reconfigurable PUF devices based on fully electric field-controlled domain wall motion to control turn-on of the first transistors of devices of any row as well as pinning of the magnetic domain walls;
   the column decoder is connected to the sources of the first transistors and another upper electrodes, other than the upper electrodes connected with the first transistors, of the reconfigurable PUF devices to provide a fed current to any column, and controls the gates of the second transistors in any column, and controls turn-on and turn-off of a read channel;
   the read circuit is connected to the sources of the second transistors to provide the read current; and
   the comparison output circuit implements comparison and random result output.

* * * * *